United States Patent
Kennedy

(10) Patent No.: US 6,744,803 B2
(45) Date of Patent: Jun. 1, 2004

(54) HIGH BRIGHTNESS LASER OSCILLATOR WITH SPHERICAL ABERRATION

(75) Inventor: Chandler J. Kennedy, Town & Country, MO (US)

(73) Assignee: Northrop Grumman Corporation, Redondo Beach, CA (US)

(*) Notice: Subject to any disclaimer, the term of this patent is extended or adjusted under 35 U.S.C. 154(b) by 0 days.

(21) Appl. No.: 10/052,963

(22) Filed: Jan. 17, 2002

(65) Prior Publication Data

US 2003/0133488 A1 Jul. 17, 2003

(51) Int. Cl.[7] .................................................. H01S 3/08
(52) U.S. Cl. ........................................... 372/92; 372/97
(58) Field of Search ............................. 372/92, 12, 97, 372/101, 25; 359/707

(56) References Cited

U.S. PATENT DOCUMENTS

| | | | |
|---|---|---|---|
| 3,820,038 A | 6/1974 | Tomlinson | 372/12 |
| 4,156,209 A | 5/1979 | Herbst et al. | 372/101 |
| 4,575,854 A | 3/1986 | Martin | 372/75 |
| 4,710,940 A | 12/1987 | Sipes, Jr. | 372/75 |
| 5,148,445 A | 9/1992 | Liu et al. | 372/97 |
| 5,434,875 A | 7/1995 | Rieger et al. | 372/25 |
| 6,178,040 B1 | 1/2001 | Injeyan et al. | 359/346 |
| 6,490,299 B1 | 12/2002 | Raevsky et al. | 372/10 |

FOREIGN PATENT DOCUMENTS

EP  001107403  6/2001  ............ H01S/3/07

OTHER PUBLICATIONS

Endriz, John G., et al., "*High Power Diode Laser Arrays*," IEEE Journal of Quantum Electronics, vol. 28, No. 4, pp. 952–965 (Apr. 1992).

Hughes, D. W., et al., "*Laser Diode Pumped Solid State Lasers*," Journal of Physics D: Applied Physics, vol. 25, No. 4, pp. 563–586 (Apr. 1992).

Hodgson, N., et al., "*Influence of Spherical Aberration of the Active Medium on the Performance of Nd: YAG Lasers,*" IEEE Journal of Quantum Electronics, vol. 29, No. 9, pp. 2497–2507 (Sep. 1993).

Kennedy, Chandler, "Helicoid Modal Analysis of Laser Oscillators with Spherical Aberration," Applied Optics, vol. 41, No. 33, pp. 6991–6999 (Nov. 20, 2002).

Martinez–Herrero, R., et al., "*Beam–Quality Changes Generated by Thermally–Induced Spherical Aberration in Laser Cavities,*" IEEE Journal of Quantum Electronics, vol. 31, No. 12, pp. 2173–2176 (Dec. 1995).

Stein, Alexander, "*Thermooptically Perturbed Resonators,*" IEEE Journal of Quantum Electronics, vol. QE–10, No. 4, pp. 427–434 (Apr. 1974).

Primary Examiner—Paul Ip
Assistant Examiner—Hung T Vy
(74) Attorney, Agent, or Firm—Jenkens & Gilchrist

(57) ABSTRACT

A laser oscillator (10) including a reflective mirror (14) and an output coupler mirror (24). Two gain media (16, 22) are disposed between the reflective mirror (14) and the output coupler mirror (24) and each are pumped with energy to produce laser oscillation between the reflective mirror (14) and the output coupler mirror (24). Each of the two gain media (16, 22) has a focal strength during operation that is formed by thermal and mechanical stress. The laser oscillator (10) also includes a lens system (18) disposed between the two solid state gain media (16, 22) and has a focal strength about equal to or greater than a product of the focal strength of the two media (16, 22). A polarization rotator (20) is also included in the laser oscillator and is disposed between the two gain media (16, 22).

26 Claims, 3 Drawing Sheets

HIGH BRIGHTNESS LASER OSCILLATOR WITH SPHERICAL ABERRATION

GOVERNMENT CONTRACT INFORMATION

This invention was made with Government support under Government Contract No. DASG-60-00-C-0100 awarded by the United States Army. The Government has certain rights in this invention.

BACKGROUND OF THE INVENTION

1. Field of the Invention

The present invention relates generally to laser oscillators and, more particularly, to laser oscillators having a negative spherical aberration.

2. Discussion of the Related Art

High power solid state lasers based on rod geometry use laser oscillators containing a sequence of elements, such as lenses, mirrors, or Gaussian apertures. These components transform beam characteristics (such as scale size and wavefront curvature) each time the beam encounters them in the course of a round trip. A stable laser oscillator is one for which a particular beam can start out and return to its initial position unchanged in scale and curvature from the beam which started out. A maximum of one such beam is possible for a given laser oscillator.

If the laser oscillator includes a lens having a variable power (inverse of focal length), then a small change in the lens power will produce a change in the scale size of the beam that is supported by the laser oscillator. This change can be to increase the beam scale with increasing lens power. Laser oscillators which increase the beam scale with lens power are said to have a "positive slope," and those which decrease beam scale with lens power are said to have a "negative slope."

Prior art laser oscillators that achieve high beam quality and efficiency tend to have a positive slope. These laser oscillators, which are designed for high beam quality and efficiency, achieve large beam scale size in the rod by operation near an upper stability limit where scale size becomes infinite. At the upper limit (in terms of rod focal power), the laser oscillator slope is positive and, at the lower limit, it is negative. Operation at the upper limit allows the laser pump power to be turned down (since rod focal power is proportional to pump power) and still be stable, which is a convenience for alignment of the laser resonator. Further, in these laser oscillators with positive slopes, degradation due to aging does not cause the laser resonator to go unstable. Such high power solid state lasers, however, suffer from large spherical aberration, lensing, and strain birefringence.

On the other hand, current laser oscillators that operate near the lower limit of beam stability (i.e., laser oscillators with a negative slope) have higher power thresholds. These laser oscillators cannot, however, be operated at lower powers and aging tends to make the laser oscillator unstable. Thus, there exists a need for a solid state laser operating near the lower limit of stability that outputs high power and high quality beams.

SUMMARY OF THE INVENTION

The present invention is a laser oscillator having a reflective mirror and an output coupler mirror. Two gain media are disposed between the reflective mirror and the output coupler mirror. The gain media are pumped with energy to produce laser oscillation between the reflective mirror and the output coupler mirror. Each of the gain media has a focal strength during operation that is formed by thermal and mechanical stress. The laser oscillator also includes a lens system that is disposed between the two gain media. The lens system has a focal strength about equal to or greater than a product of the focal strengths of the two gain media. Also included is a polarization rotator disposed between the two gain media.

The lens system is a negative power lens system that forces the laser oscillator to have a negative slope. The reflective mirror is preferably graded. Thus, the laser oscillator is able to achieve a high output with spherical aberration.

The above summary of the present invention is not intended to represent each embodiment or every aspect of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

Figure 1:
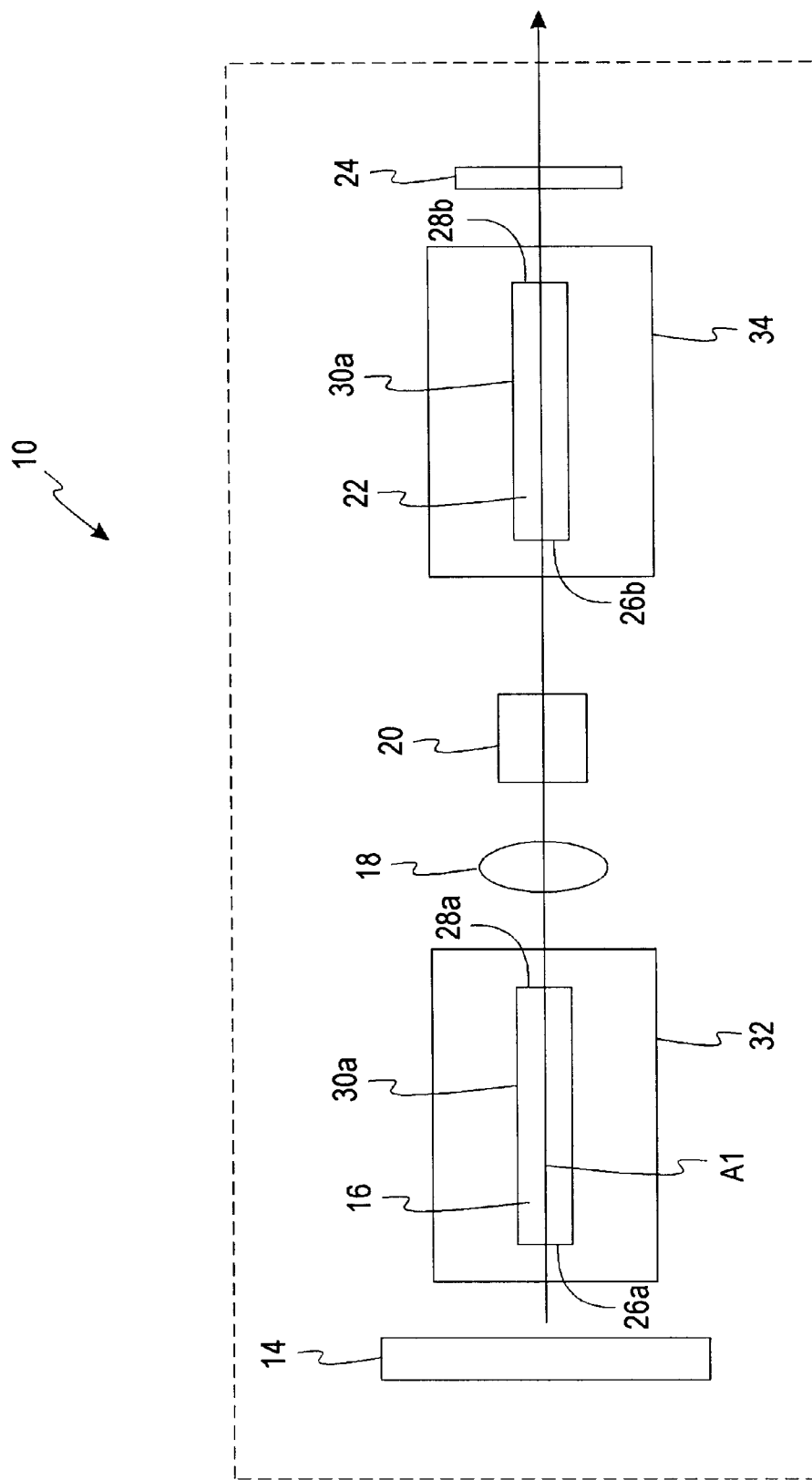
FIG. 1 is a block diagram of a laser oscillator according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF PREFERRED EMBODIMENTS

FIG. 1 illustrates a block diagram of a solid state laser oscillator 10. The laser oscillator 10 includes a high reflective mirror 14, a first gain medium 16, a mode control lens 18, a polarization rotator 20, a second gain medium 22, and an output coupler mirror 24.

The first and second gain media 16, 22 are cylindrical rods substantially centered on an axis A1, and having two end surfaces 26a, 26b, 28a, 28b and cylindrical outer surfaces 30a, 30b. The first and second gain media 16, 22 may be one of various types of commonly used media, such as Neodymium-doped, Yttrium-Aluminum Garnet (Nd:YAG). Energy is pumped into the first and second gain media 16, 22 by first and second pump chambers 32, 34, respectively. The first and second pump chambers 32, 34 each include optical energy sources that produce optical energy to be absorbed into each of the first and second gain media 16, 22. The optical energy sources are configured to emit the optical energy into the cylindrical outer surfaces 30a, 30b of the two gain media 16, 22.

During operation, the first and second gain media 16, 22 have focal lengths that are caused by thermal and mechanical stress. The first and second gain media 16, 22 generate families of discrete beams with differing intensity profiles, referred to as modes. Modes generally differ in beam quality or focusability. Higher order modes have decreased beam quality since they are larger in lateral extent (i.e., wider). To filter out the higher order modes, the first and second gain media 16, 22 act themselves as limiting apertures to permit the lower order, higher quality beams to oscillate. Higher order modes suffer loss at every oscillation, eventually leading to their extinction.

When the first and second gain media 16, 22 are made of Nd:YAG, the optical energy is pumped into the first and second gain media 16, 22 at a wavelength of about 808 nm. This is typically accomplished by use of AlGaAs laser diodes as the energy source in the pump chambers 32, 34.

Nd:YAG gain media 16, 22 have negative spherical aberration, particularly when the pumped energy is more intense on the central axis A than away from it. Thus, the focal strength of gain media 16, 22 decreases with increasing distance away from the central axis A. If the laser oscillator 10 has negative spherical aberration, then the laser oscillator 10 may have either a negative or a positive slope. If the slope of the laser oscillator is positive, then the higher order modes will have smaller scale sizes, because the negative aberration reduces the effective power of the lens. If the slope of the resonator is negative, however, then the higher order modes will have larger scale sizes. Reducing the scale size for the higher order modes allows more of these modes to exist within a given aperture. Increasing scale size with higher order modes makes the aperture more effective at eliminating these low quality modes and improves overall beam quality. Thus, having a "negative slope" produces better results than having a "positive slope."

To force the laser oscillator into a negative slope, the mode control lens 18, which has a negative power, is placed between the first and second gain media 16, 22. The mode control lens 18 has a focal strength that is about equal to or greater than the combined focal strength of the first and second gain media 16, 22 when the first and second gain media 16, 22 are operational. By having a negative slope, the higher order modes of the laser oscillator 10 have larger scale sizes. Increasing the scale size with mode order makes the limiting aperture of the first and second gain media 16, 22 more effective at eliminating these low quality modes and improves overall beam quality. By forcing the laser oscillator 10 to have a negative slope, however, the laser oscillator 10 is operating near the lower limit of stability, meaning that the laser oscillator 10 tends to become unstable with aging.

To correct any problem of stability in a large scale laser oscillator, the output coupler mirror 24 is included as a second limiting aperture. The output coupler mirror 24 is a radially-graded reflectivity output coupler mirror 24 that has a Gaussian reflectivity profile, such that more energy is transmitted along the axis A while less energy is transmitted at distances away from the axis A. The graded reduction in reflection as a function of radius has a Gaussian shape. In one embodiment with a rod having a diameter of 5 mm, the output coupler mirror 24 has a peak reflectivity of from about 60% to about 80%, preferably about 75% at the center, and reflectivity tapers off to about 0% adjacent to a periphery of the output coupler mirror 24. The output coupler mirror 24 results in finite stable beam scales where there would otherwise be infinite or unstable beam scales. In one embodiment, the output coupler mirror 24 has a diameter of about 3 mm and, in another embodiment, the output coupler mirror 24 has a diameter of about 5 mm, although this value may vary from resonator to resonator.

Strain-induced bi-lensing is also a problem experienced in laser oscillators. Strain-induced bi-lensing occurs when a pumped laser rod has a focal length that depends on polarization. The different beam qualities limit the effect of the output coupler mirror 24, because one polarization state typically has a smaller scale than the other polarization state and, thus, resists the effect of the output coupler mirror 24. A Gaussian aperture has no effect on beams with different polarizations. The polarization rotator 20 is included to rotate the polarization 90 degrees, which minimizes separation of beams due to bi-lensing. The polarization rotator 20 minimizes the difference in scale between modes with different polarizations and, thus, helps to maximize beam quality. In one embodiment, the polarization rotator 20 is a crystal quartz polarization rotator placed between the first and second gain media 16, 22. In an embodiment where only one gain medium 16 is used, a 45 degree Faraday rotator may be placed between the rod and the high reflective mirror 14 to produce the same effect.

The operation of the laser oscillator 10 in FIG. 1 will now be described in more detail. As described above, the first and second gain media 16, 22 are pumped by the pump chambers 32, 34 to create beams from the gain media 16, 22. These beams are oscillated between the reflective mirror 14 and the output coupler mirror 24 and eventually output as a beam having a wavelength of about 1064 nm. During the oscillations, the beams pass through the polarization rotator 20 and the mode control lens 18. As described above, the mode control lens 18 is a negative power lens having a focal strength equal to or greater than the combined operation-induced focal strength of the two gain media 16, 22, which is determined by multiplying the individual focal strengths. The resultant product is the combined focal strength for the system.

A high brightness laser beam is released from the output coupler mirror 24. The output beam is a high brightness laser beam because the higher order beams, which have lower brightness levels, are not outputted due to the limiting aperture of the first and second gain media 16, 22 and the output coupler 24 for the reasons described above.

Figure 2:
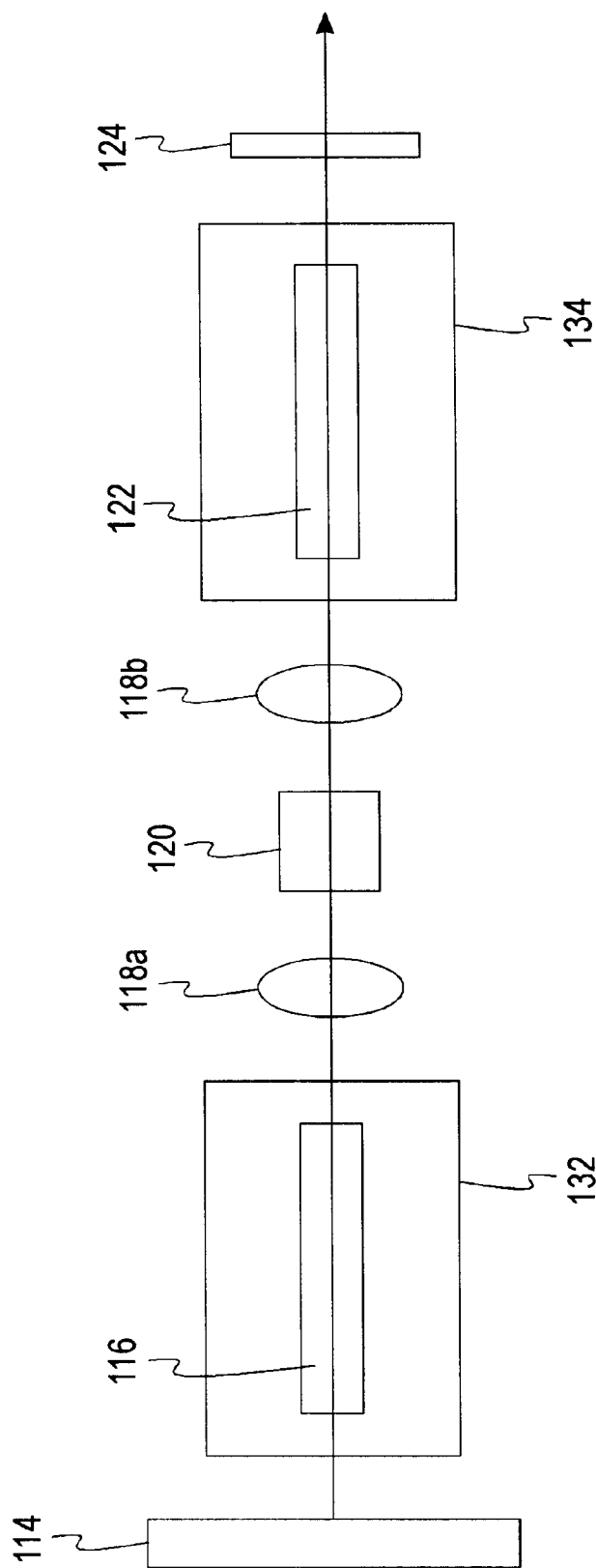
FIG. 2 is a block diagram of a laser oscillator according to another embodiment of the present invention.

Turning now to FIG. 2, another embodiment of a laser oscillator 110 according to the present invention is illustrated. The laser oscillator 110 includes a reflective mirror 114, a first gain medium 116, a first mode control lens 118a, a polarization rotator 120, a second mode control lens 118b, a second gain medium 122, and an output coupler mirror 124. The first and second gain media 116, 122 are pumped by first and second pump chambers 132, 134. All of the components operate in the same fashion as described above in FIG. 1.

In this embodiment, the first and second mode control lenses 118a, 118b are both negative power mode control lenses. The first and second mode control lenses 118a, 118b may have the same focal strength or they may have different focal strengths. The individual focal strength of the first and second mode control lenses 118a, 118b is not limited as long as the combined focal strength is about the same or greater than the combined focal strength of the first and second gain media 116, 122. The first and second mode control lenses 118a, 118b may be placed between the first and second gain media 116, 122 on either side of the polarization rotator 120. Alternatively, the first and second mode control lenses 118a, 118b may be adjacent to one another on either side of the polarization rotator 120.

EXAMPLE

The following example is presented to demonstrate the beam quality ($M^2$) of the embodiment of the laser oscillator 110 described with reference to FIG. 2. The reflective mirror 114 is a high reflectivity flat mirror designed to reflect substantially all of the laser beams. The first and second gain media 116, 122 are about 35 mm to about 40 mm from the reflective mirror 114 and the output coupler 124, respectively. Each of the first and second gain media 116, 122 is 0.6% Nd:YAG rods of about 146 mm in length and about 5 mm in diameter. The first and second gain media 116, 122 have an operation-induced focal strength of about 7 diopters for a combined focal strength of 49 diopters. The pump chambers 132, 134 have 80 AlGaAs semiconductor diode bars that produce energy having a wavelength of about 808 nm and surround the first and second gain media 116, 122. The mode control lenses 118a, 118b are intracavity, plano-concave lenses having focal strengths of about 7 diopters. The mode control lenses 118a, 118b are made of fused silica, each having a radius of curvature of about 64.4 mm and focal lengths of about 143.2 mm. The polarization rotator 120 is a crystal quartz polarization rotator that rotates the beams 90 degrees and is placed between the mode control lenses 118a, 118b. The output coupler mirror 124 has a $1/e^2$ radius of less than 5 mm. In some embodiments, the $1/e^2$ radius is from about 0.5 mm to about 2.5 mm, preferably about 1.5 mm, with a flat substrate and an effective radius of curvature of from about 2 m to about 3 m, preferably 2.5 m, in a convex direction.

Figure 3:
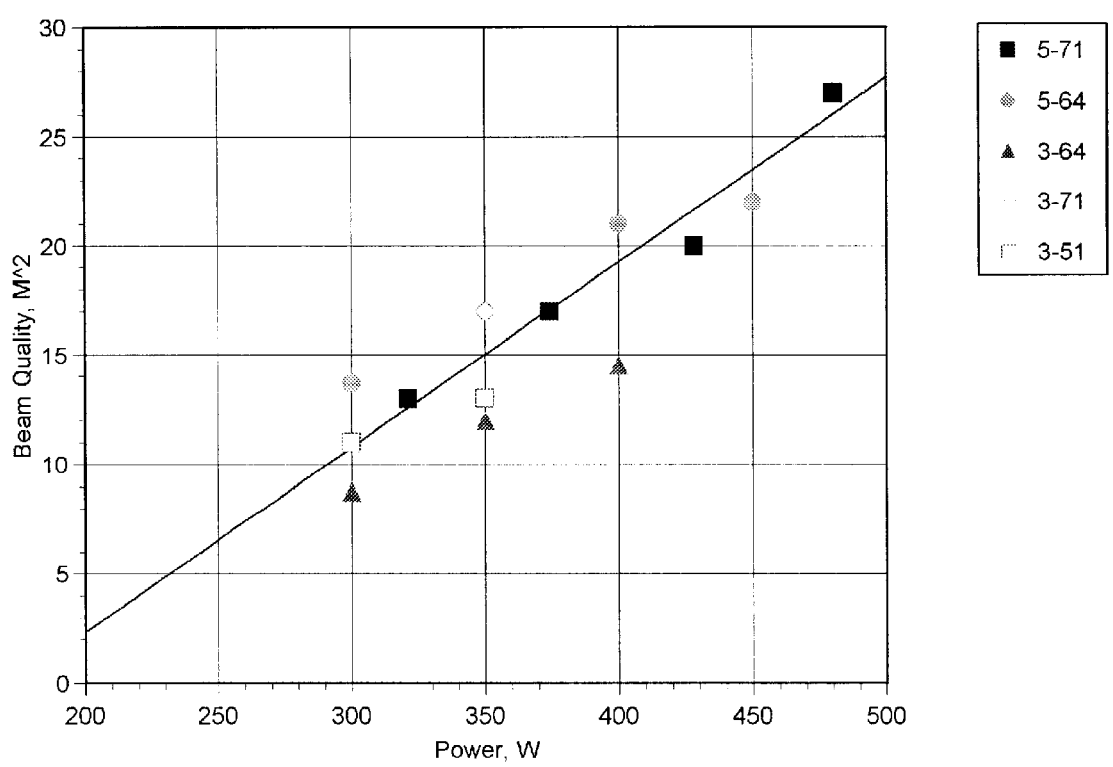
FIG. 3 is a graph depicting the beam quality versus the output power of a laser oscillator according to various embodiments of the present invention.

FIG. 3 is a graph illustrating beam quality versus the power output of the laser oscillator 110 when these specific components are used. The beam quality was measured by sending the beam through a focusing lens and measuring the second moment diameter as a function of distance. The different symbols indicate variations in the diameter of the output coupler mirror 124 and the radius of curvature of the mode control lenses 118a, 118b in millimeters. As can be seen in the graph, when the output coupler mirror 124 has a diameter of 5 mm, the beam quality is the highest. Also, when the output coupler mirror 124 has a diameter of 3 mm, the 71 mm mode control lenses 118a, 118b output the best beam quality. Thus, the diameter of the output coupler mirror 124 affects beam quality and needs to be carefully selected in order to achieve the best power and beam quality for a specific oscillator.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A laser oscillator, comprising:
   a reflective mirror;
   an output coupler mirror having a radially-graded reflectivity;
   two gain media disposed between said reflective mirror and said output coupler mirror and being pumped with energy to produce laser oscillation between said reflective mirror and said output coupler mirror, each of said two gain media having a negative spherical aberration and a focal strength that is formed by thermal an mechanical stress;
   a mode control lens system disposed between said two gain media and having a focal strength about equal to or greater than a product of said focal strength of said two media wherein said laser oscillator operates with a negative slope; and
   a polarization rotator disposed between said two gain media.

2. The laser oscillator of claim 1, wherein said radially graded reflectivity has a Gaussian profile.

3. The laser oscillator of claim 2, wherein said output coupler mirror has a peak reflectivity of from about 60% to about 80%.

4. The laser oscillator of claim 2, wherein said output coupler mirror has a reflectivity that tapers to a minimum value adjacent to a periphery of said output coupler mirror.

5. The laser oscillator of claim 1, wherein said output coupler mirror has a $1/e^2$ radius from approximately 0.5 mm to approximately 2.5 mm.

6. The laser oscillator of claim 1, wherein said output coupler mirror has a convex radius of curvature that is from about 2 m to about 3 m.

7. The laser oscillator of claim 1, wherein said lens system disposed between said two gain media comprises two negative power lenses, said two negative power lenses having a combined focal strength that is about equal to or greater than the combined focal strength of said two media.

8. The laser oscillator of claim 1, wherein said control lens system disposed between said two gain media comprises one negative power mode control lens.

9. The laser oscillator of claim 1, wherein said two gain media are cylindrical in shape.

10. The laser oscillator of claim 1, wherein said two gain media are Neodymium-doped, Yttrium-Aluminum Garnet (Nd:YAG).

11. The laser oscillator of claim 1, wherein said polarization rotator is a quartz polarization rotator.

12. A laser oscillator, comprising:
    a high reflective mirror;
    a graded reflectivity output coupler mirror having a $1/e^2$ radius of less than 5 mm;
    two solid state gain media being optically pumped, said two media disposed between said high reflective mirror and said graded reflectivity output coupler mirror, each of said two solid state gain media having a negative spherical aberration;
    a mode control lens system disposed between said two solid state gain media, causing said solid state gain media to have a negative slope; and
    a polarization rotator disposed between said two solid state gain media wherein said laser oscillator operates with a negative slope.

13. The laser oscillator of claim 12, wherein said polarization rotator is a quartz polarization rotator.

14. The laser oscillator of claim 12, wherein said output coupler mirror has a peak reflectivity of from about 60% to about 80% and the reflectivity tapers to about 0%.

15. The laser oscillator of claim 12, wherein said two gain media are Neodymium-doped, Yttrium-Aluminum Garnet (Nd:YAG).

16. The laser oscillator of claim 12, said lens system disposed between said two gain media comprises two negative power mode control lenses, said two negative power mode control lenses having a combined focal strength that is about equal to or greater than a combined focal strength of said two media.

17. The laser oscillator of claim 12, wherein said control lens system disposed between said two gain media comprises one negative power mode control lens.

18. A laser system, comprising:
    a high reflective mirror;
    an output coupler mirror having a graded reflectivity;
    two solid state gain media, each having two end surfaces and a cylindrical outer surface between said end surfaces, said two media disposed between said high reflective mirror and said output coupler mirror, each of said two gain media having a negative spherical aberration and a focal strength;

optical energy sources producing optical energy to absorbed in each of said two gain media, said plurality of optical energy sources being disposed to emit said optical energy into said cylindrical outer surface of each of said two gain media;

a negative power mode control lens system disposed between said two gain media and having a focal strength about equal to or greater than the product of said focal strengths of said two media; and a quartz polarization rotator disposed between said two media wherein said laser oscillator operates with a negative slope.

19. The laser system of claim 18, wherein said graded reflectivity output coupler mirror is radially graded and has a peak reflectivity of from about 60% to about 80%.

20. The laser system of claim 18, wherein said output coupler mirror has a $1/e^2$ radius from approximately 0.5 mm to approximately 2.5 mm.

21. The laser system of claim 18, wherein said two gain media are Neodymium-doped, Yttrium-Aluminum Garnet (Nd:YAG).

22. The laser system of claim 18, wherein said lens system disposed between said two gain media comprises two negative power mode control lenses, said two negative power mode control lenses having a combined focal strength that is about equal to or greater than the combined focal strength of said two media.

23. The laser system of claim 18, wherein two gain media are Neodymium-doped, Yttrium-Aluminum Garnet (Nd:YAG) and said energy sources are semiconductor laser diodes.

24. A method of producing a high brightness laser beam, comprising:

pumping two laser rods to create a combined output from said laser rods, said pumping causing said two laser rods having a negative spherical aberration;

oscillating said output between a high reflective mirror and an output coupler mirror, said output coupler mirror having a graded reflectivity;

passing said output through a polarization rotator positioned between said two laser rods;

passing said output through a negative power lens system having a focal strength greater than the combined operation-induced focal strengths of said two laser rods; and releasing said high brightness laser beam from said output coupler mirror wherein said laser oscillator operates with a negative slope.

25. A method of producing a high brightness laser beam from a laser oscillator, comprising:

providing two gain media having a negative spherical aberration;

forcing said two laser rods into a negative slope condition with a negative power lens system; and outputting a high brightness laser beam from said laser oscillator said outputting including passing an output from said two laser rods through a graded reflectivity output coupler mirror acting as a limiting aperture to a stable beam, causing said high brightness laser beam to have increased beam stability; and passing an output from said two gain media through a polarization rotator located between said two gain media.

26. The method of claim 25, wherein the step of forcing said two laser rods to have a negative slope comprises providing the negative power lens system with two negative power lenses having a combined focal strength that is about equal to or greater than a combined operation-induced focal strength of said two laser rods.

* * * * *